(12) United States Patent
Jendbro (10) Patent No.: US 9,191,483 B2
(45) Date of Patent: Nov. 17, 2015

(54) AUTOMATICALLY GENERATED MESSAGES BASED ON DETERMINED PHONE STATE

(75) Inventor: Magnus Jendbro, Staffanstorp (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1938 days.

(21) Appl. No.: 11/680,004

(22) Filed: Feb. 28, 2007

(65) Prior Publication Data
US 2008/0207173 A1    Aug. 28, 2008

(51) Int. Cl.
*H04M 1/725*    (2006.01)

(52) U.S. Cl.
CPC ...... *H04M 1/72552* (2013.01); *H04M 1/72566* (2013.01); *H04M 1/72572* (2013.01)

(58) Field of Classification Search
CPC ........... H04W 4/00; H04W 4/12; H04W 4/18; H04W 64/006; H04W 4/14; H04W 4/16
USPC ....................................... 455/550.1, 418, 466
See application file for complete search history.

(56) References Cited

U.S. PATENT DOCUMENTS

| | | | |
|---|---|---|---|
| 7,619,584 B2 * | 11/2009 | Wolf | 345/1.2 |
| 2002/0004736 A1 * | 1/2002 | Roundtree et al. | 705/10 |
| 2003/0092454 A1 * | 5/2003 | Halim et al. | 455/466 |
| 2005/0101335 A1 | 5/2005 | Kelly et al. | |
| 2005/0153729 A1 * | 7/2005 | Logan et al. | 455/550.1 |

OTHER PUBLICATIONS

PCT International Search Report with Written Opinion for corresponding PCT Application No. PCT/IB2007/053450, mailed Mar. 4, 2008, 12 pages.

* cited by examiner

*Primary Examiner* — Michael Faragalla
(74) *Attorney, Agent, or Firm* — Tucker Ellis LLP

(57) ABSTRACT

A method performed by a mobile terminal may include storing a plurality of text messages in a mobile terminal, determining a state of the mobile terminal; and selecting and displaying one of the plurality of stored text messages based on the determined state of the mobile terminal.

15 Claims, 11 Drawing Sheets

700

| | TEMPLATE MESSAGES |
|---|---|
| 710 | HI *NAME*, I AM IN A MEETING NOW THAT ENDS AT *TIME*, I WILL CALL YOU BACK WHEN IT IS OVER. |
| 720 | HI *NAME*, I AM RUNNING LATE FOR OUR *TIME* APPOINTMENT. I AM *DISTANCE* MILES AWAY SO PLEASE WAIT FOR ME. |
| 730 | HI *NAME*, I AM RUNNING LATE AS THE TRAFFIC IS BACKED UP. I AM *DISTANCE* MILES AWAY, SO GO AHEAD AND START WITHOUT ME. |
| 740 | HI *NAME*, I AM AT THE *EVENT*! TO SEE WHAT YOU ARE MISSING CHECK OUT *LINK*. |
| 750 | I'M SICK TODAY AND CAN'T TALK, I WILL CALL YOU TOMORROW IF I CAN. |

| MONDAY, JAN 29 | TUESDAY, JAN 30 | WEDNESDAY, JAN 31 |
|---|---|---|
| 6 AM | 6 AM | 6 AM |
| 7 AM | 7 AM | 7 AM |
| 8 AM | 8 AM | 8 AM |
| 9 AM | 9 AM | 9 AM |
| 10 AM | 10 AM | 10 AM |
| 11 AM | 11 AM LUNCH GLENN'S | 11 AM LUNCH |
| 12 PM LUNCH | 12 PM | 12 PM |
| 1 PM | 1 PM | 1 PM |
| 2 PM | 2 PM | 2 PM MEETING |
| 3 PM | 3 PM | 3 PM |
| 4 PM | 4 PM | 4 PM |
| 5 PM | 5 PM | 5 PM |
| 6 PM | 6 PM | 6 PM AIRPORT |
| 7 PM | 7 PM | 7 PM |
| 8 PM FOOTBALL | 8 PM KISS CONCERT | 8 PM |
| 9 PM | 9 PM | 9 PM LAS VEGAS |
| 10 PM | 10 PM | 10 PM HOTEL |
| 11 PM | 11 PM | 11 PM |

| TEMPLATE MESSAGES |
|---|
| HI NAME, I AM IN A MEETING NOW THAT ENDS AT TIME, I WILL CALL YOU BACK WHEN IT IS OVER. |
| HI NAME, I AM RUNNING LATE FOR OUR TIME APPOINTMENT. I AM DISTANCE MILES AWAY SO PLEASE WAIT FOR ME. |
| HI NAME, I AM RUNNING LATE AS THE TRAFFIC IS BACKED UP. I AM DISTANCE MILES AWAY, SO GO AHEAD AND START WITHOUT ME. |
| HI NAME, I AM AT THE EVENT. TO SEE WHAT YOU ARE MISSING CHECK OUT LINK. |
| I'M SICK TODAY AND CAN'T TALK, I WILL CALL YOU TOMORROW IF I CAN. |

AUTOMATICALLY GENERATED MESSAGES BASED ON DETERMINED PHONE STATE

TECHNICAL FIELD OF THE INVENTION

The systems and methods described herein generally relate to communications devices and, more particularly, to text messaging.

DESCRIPTION OF RELATED ART

Communication devices, such as cellular telephones, have become increasingly versatile. For example, cellular telephones often include text messaging capabilities. At the present time however, text messaging features employed on cellular telephones and portable communications devices are limited by inefficient methods of text entry.

SUMMARY

According to one aspect, a method is provided. The method may include storing a plurality of messages in a mobile terminal, determining a state of the mobile terminal, providing at least one of the plurality of stored messages based on the determined state of the mobile terminal and transmitting a text message to a second mobile terminal, the text message being based on the at least one provided message.

Additionally, the method may further comprise storing a calendar of events; and determining a position of the mobile terminal.

Additionally, the state of the mobile terminal may be determined based on the events in the calendar and the position of the mobile terminal.

Additionally, the method may further comprise inserting information into the provided at least one message based on the events in the calendar and the position of the mobile terminal.

Additionally, the method may further comprise inserting links in the provided at least one message based on events in the calendar.

According to another aspect, a mobile terminal is provided. The mobile terminal may comprise a memory for storing a calendar of events and a plurality of text messages; a display; and logic configured to: determine the state of the mobile terminal based on the calendar, select at least one of the stored plurality of text messages based on the determined state of the mobile terminal, and control the display to display the at least one selected text message.

Additionally, the logic may be further configured to determine a position of the mobile terminal.

Additionally, the logic may be further configured to insert information into the text messages based on at least one of the position of the mobile terminal or events in the calendar.

Additionally, the logic may be further configured to select more than one of the stored plurality of text messages based on the determined state of the mobile terminal.

Additionally, the logic may be further configured to display at least a portion of each of the selected more than one messages.

According to another aspect, a mobile terminal is provided. The mobile terminal may comprise: means for determining a state of the mobile terminal; means for inserting text into at least one of a plurality of stored template messages based on the determined state of the mobile terminal; and means for displaying the at least one template message.

Additionally, the mobile terminal may further comprise means for storing a plurality of template messages.

Additionally, the mobile terminal may further comprise means for selecting at least one of the plurality of stored template messages based on the determined state of the mobile terminal.

Additionally, the mobile terminal may further comprise means for selecting one of the displayed template message.

Additionally, the mobile terminal may further comprise means for editing the displayed template message.

Additionally, the mobile terminal may further comprise means for sending the displayed template message to a second mobile terminal.

Additionally, the means for determining a state of the mobile terminal may further comprise means for storing events; and means for determining a position of the mobile terminal.

Additionally, the text inserted into the at least one template message includes information relating to at least one of the stored events and the determined position of the mobile terminal.

Additionally, the mobile terminal may further comprise means for inserting links into the at least one template message based on the determined position of the mobile terminal.

Additionally, the mobile terminal may further comprise means for allowing a user to enter the plurality of template messages.

Other features and advantages of the systems and methods described herein will become readily apparent to those skilled in this art from the following detailed description. The implementations shown and described provide illustration of the best mode contemplated for carrying out the embodiments. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description refers to the accompanying drawings. The same reference numbers in different drawings identify the same or similar elements. Also, the following detailed description does not limit the systems and methods described herein. Instead, the scope of the systems and methods are defined by the appended claims and their equivalents.

As described herein, a device such as a mobile terminal may intelligently suggest messages that a user of a mobile terminal may wish to send. As an example, if a calendar stored in the mobile terminal indicates the user has a meeting from 10-11, and the user declines to answer an incoming call at 10:10, the mobile terminal may suggest a text message such as "in a meeting, will call you later." With relatively little interaction with the mobile terminal, the user may, if he wishes, send the suggested message.

Figure 1:
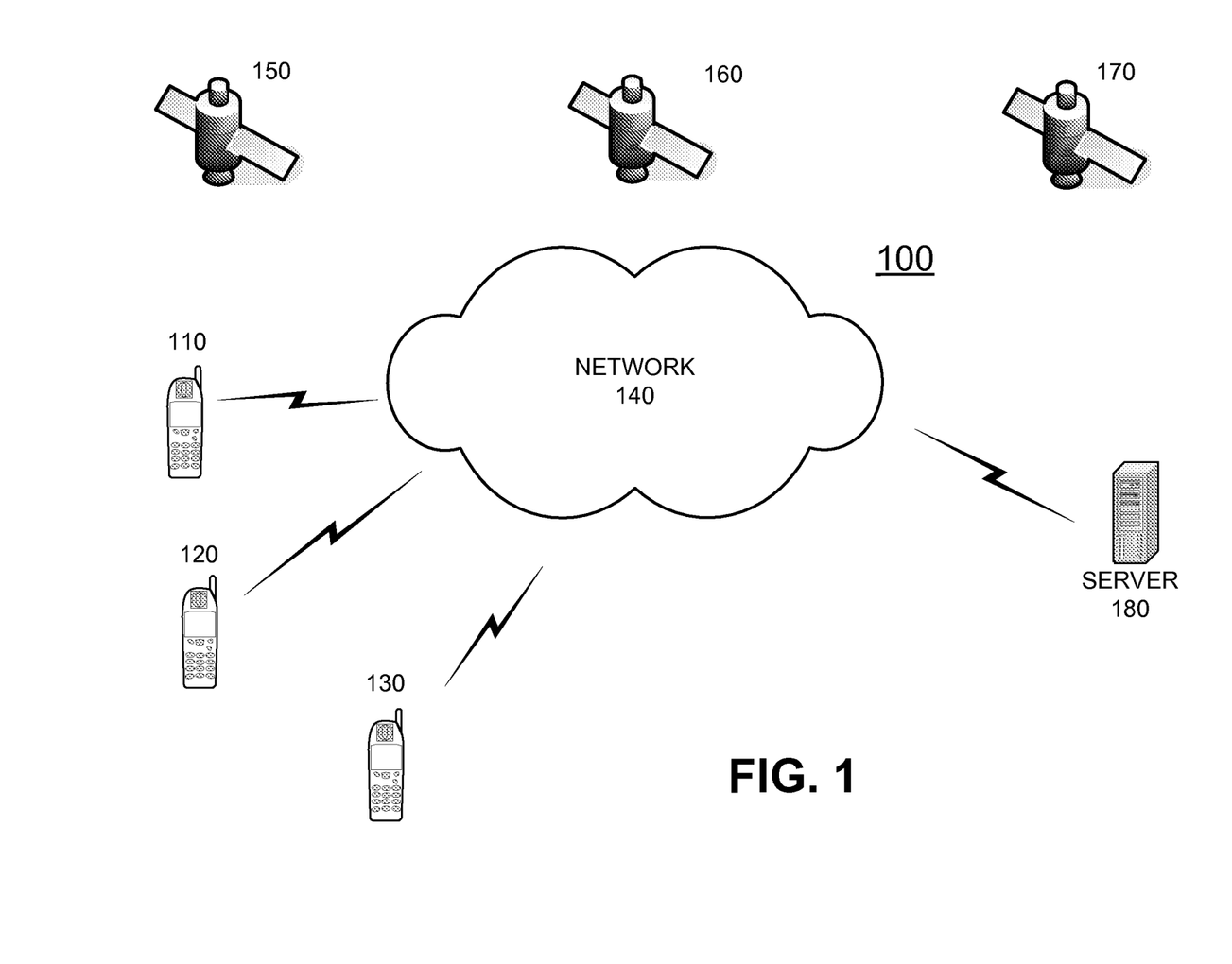
FIG. 1 is a diagram of an exemplary system in which methods and systems described herein may be implemented.

FIG. 1 is a diagram of an exemplary system 100 in which methods and systems described herein may be implemented. System 100 may include mobile terminals 110, 120 and 130, network 140, GPS satellites 150, 160 and 170, and server 180. It should be understood that system 100 may include other numbers of mobile terminals, GPS satellites and servers. System 100 may also include a number of base stations and base station antennas used to transmit information between mobile terminals 110-130.

The methods and systems described herein may be implemented in the context of a mobile terminal. As used herein, the term "mobile terminal" may include a cellular radiotelephone with a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver, a radio (AM/FM) receiver; and a laptop and/or palmtop receiver or other appliance that includes a radiotelephone transceiver. Mobile terminals may also be referred to as "pervasive computing" devices that are capable of communicating with other devices via Short Messaging Service (SMS) protocols or other protocols that allow for simultaneous communications of voice, data, music and video information.

Network 140 may include one or more networks including a cellular network, a satellite network, the Internet, a telephone network, such as the Public Switched Telephone Network (PSTN), a metropolitan area network (MAN), a wide area network (WAN), or a local area network (LAN). Mobile terminals 110, 120 and 130 may communicate with each other over network 140 via wired, wireless or optical connections.

In an exemplary implementation, network 140 includes a cellular network used for transmitting data and messages between mobile terminals 110-130. For example, components of a cellular network may include base station antennas (not shown) that transmit and receive data from mobile terminals within their vicinity. Other components of a cellular network, for example, may also include base stations (not shown) that connect to the base station antennas and communicate with other devices, such as switches and routers (not shown) in accordance with known techniques.

GPS satellites 150, 160 and 170 may include a communication interface that may include any transceiver-like mechanism and one or more processors or microprocessors enabled by software programs and/or hardware to perform functions, such as transmission of GPS signals. GPS signals transmitted by GPS satellites 150-170 may be received by mobile terminals 110-130, and may be used to calculate the position of each mobile terminal 110-130, for example.

Server 180 may include one or more processors or microprocessors enabled by software programs to perform functions, such as data storage and transmission, and interfacing with other servers (not shown) and communication devices 110-130, for example. Server 180 may also include a data storage memory, such as a random access memory (RAM) or another dynamic storage device that stores information, such as phone state information, as described below.

Figure 2:
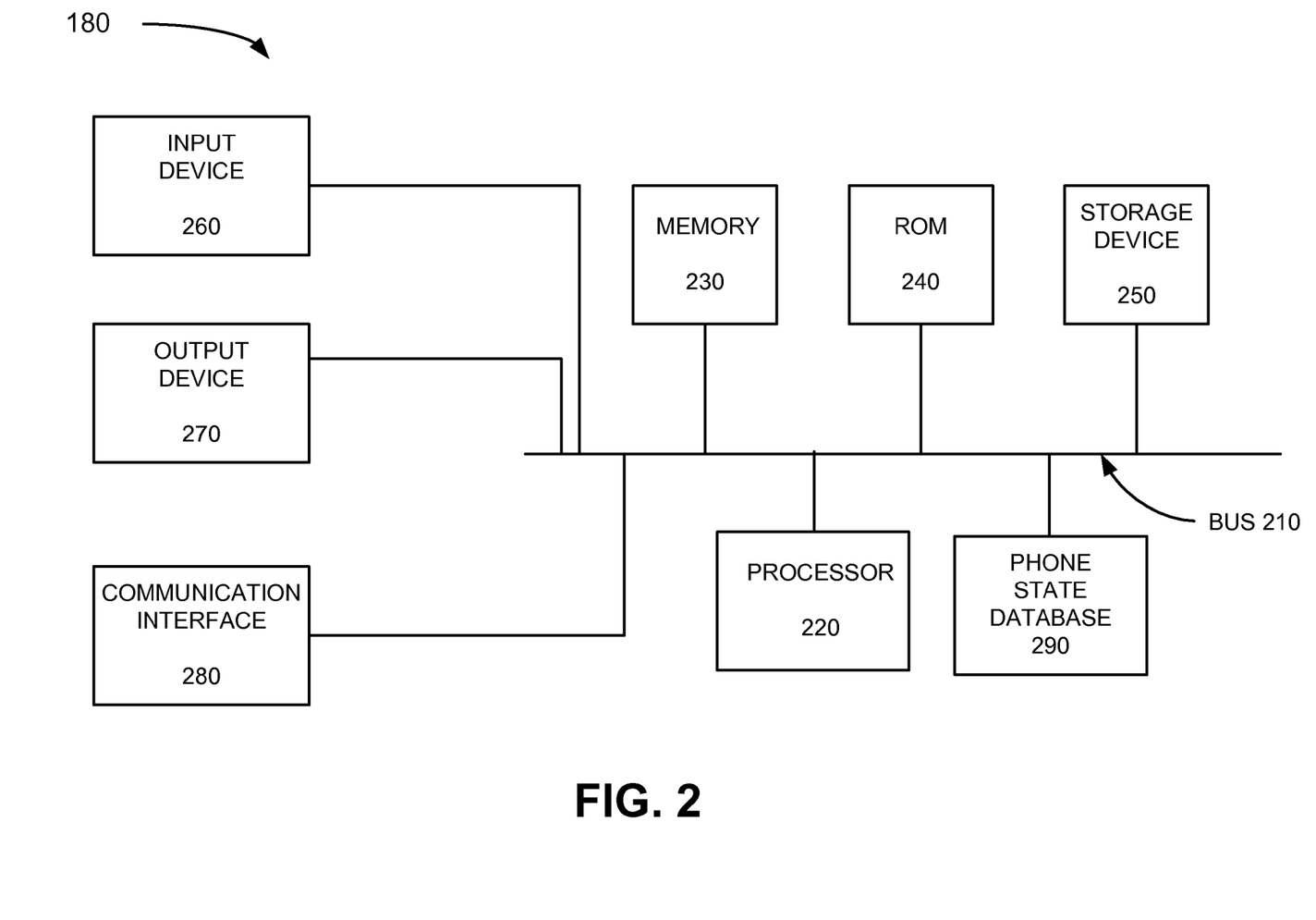
FIG. 2 is a diagram of an exemplary server of FIG. 1.

FIG. 2 is a diagram of an exemplary configuration of server 180. Server 180 may include bus 210, processor 220, a memory 230, a read only memory (ROM) 240, a storage device 250, an input device 260, an output device 270, a communication interface 280, and a phone state database 290. Server 180 may also include one or more power supplies (not shown). One skilled in the art would recognize that server 180 may be configured in a number of other ways and may include other or different elements.

Bus 210 permits communication among the components of server 180. Processor 220 may include any type of processor, microprocessor, or processing logic that may interpret and execute instructions. Processor 220 may also include logic that is able to decode media files, such as audio files, video files, etc., and generate output to, for example, a speaker, a display, etc. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Input device 260 may include one or more mechanisms that permit a user to input information to server 180, such as a keyboard, a mouse, a microphone, a pen, voice recognition and/or biometric mechanisms, etc. Output device 270 may include one or more mechanisms that output information to the user, including a display, a printer, etc.

Communication interface 280 may include any transceiver-like mechanism that enables server 180 to communicate with other devices and/or systems. For example, communication interface 280 may include a modem or an Ethernet interface to a LAN, a WLAN, and/or to a Global System Mobile (GSM) or Universal Mobile Telecommunications System (UMTS) network. Communication interface 280 may include other mechanisms for communicating via a network, such as network 140. For example, communication interface 280 may include one or more radio frequency (RF) transmitters, and one or more RF receivers and antennas for transmitting and receiving RF signals.

Phone state database 290 may include information relating to the state of a mobile terminal. For example, phone state database 290 may receive information from mobile terminal 110 that may relate to the position of mobile terminal 110 and may receive information relating to events stored in a calendar of mobile terminal 110. Using the phone state information received from a mobile terminal 110, phone state database 290 may search network 140 (or another network such as the Internet), for information relating to the current position of mobile terminal 110 or events stored in mobile terminal 110. Processor 220 and/or phone state database 290 may perform processing for receiving, identifying, searching and transmitting information to mobile terminals 110-130. For example, processor 220 and/or phone state database 290 may transmit information, such as links to websites, based on the received phone state information.

According to an exemplary implementation, server 180 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hardwired circuitry may be used in place of or in combination with software instructions to implement aspects of the embodiments. Thus, the systems and methods described herein are not limited to any specific combination of hardware circuitry and software.

Figure 3:
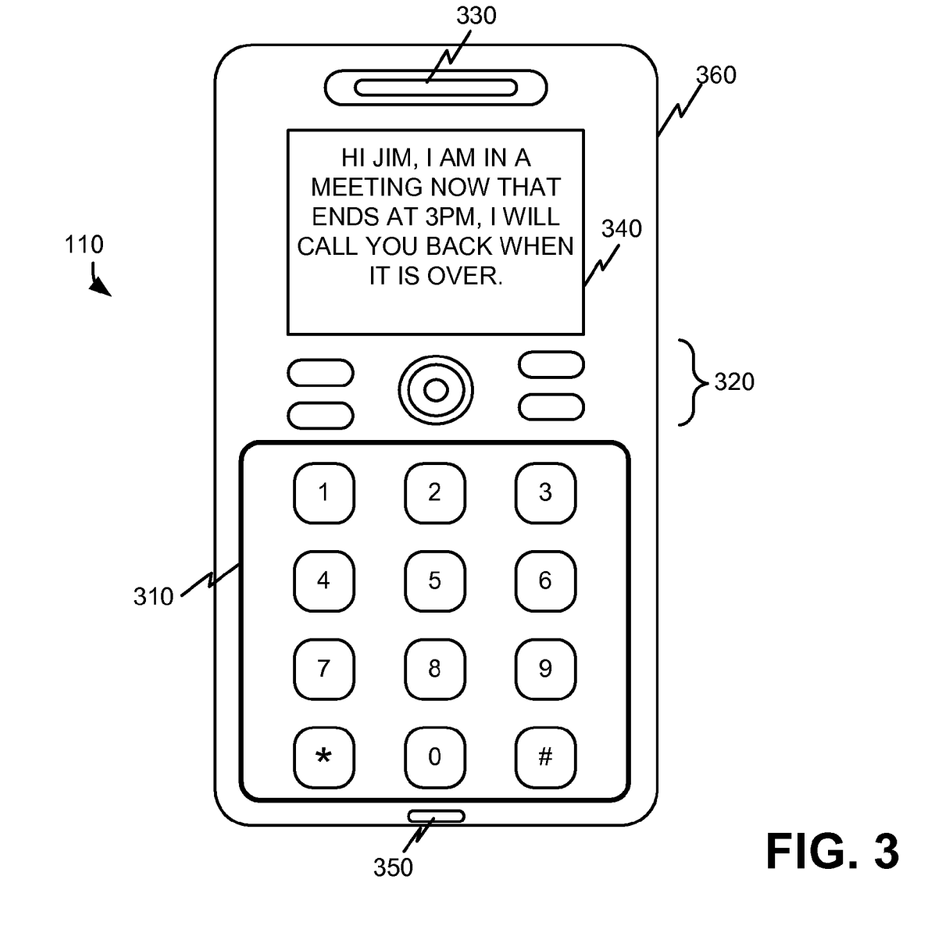
FIG. 3 is a block diagram illustrating an exemplary mobile terminal.

FIG. 3 shows an exemplary mobile terminal 110 that may include housing 360, keypad 310, control keys 320, speaker 330, display 340, and microphone 350. Housing 360 may include a structure configured to hold devices and components used in mobile terminal 110. For example, housing 360 may be formed from plastic, metal, or composite and may be configured to support keypad 310, control keys 320, speaker 330, display 340 and microphone 350.

Keypad 310 may include devices and/or logic that can be used to operate mobile terminal 110. Keypad 310 may further be adapted to receive user inputs, directly or via other devices, such as a stylus for entering information into mobile terminal 110. In one implementation, communication functions of mobile terminal 110 may be controlled by activating keys in keypad 310. Implementations of keys may have key information associated therewith, such as numbers, letters, symbols, etc. The user may operate keys in keypad 310 to place calls, enter digits, commands, and text messages into mobile terminal 110. Designated functions of keys may form and/or manipulate images that may be displayed on display 340.

Control keys 320 may include buttons that permit a user to interact with mobile terminal 110 to perform specified actions, such as to interact with display 340, etc. For example, a user may use control keys 320 to select from a menu of choices that may include, for example, a menu item to send or receive text messages to another mobile terminal 120-130.

Speaker 330 may include a device that provides audible information to a user of mobile terminal 110. Speaker 330 may be located anywhere on mobile terminal 110 and may function, for example, as an earpiece when a user communicates using mobile terminal 110. Speaker 330 may also function as an output device for playing music, or generating an alarm tone in an emergency, for example.

Display 340 may include a device that provides visual images to a user. For example, display 340 may display text to a user, such as a message "Hi Jim, I am in a meeting now that ends at 3 PM, I will call you back when it is over." Display 340 may also display graphic information regarding incoming/outgoing calls, text messages, phonebooks, volume settings, etc., to a user of mobile terminal 110. Implementations of display 340 may be implemented as black and white or color displays, such as a liquid crystal display (LCD).

Microphone 350 may include a device that converts speech or other acoustic signals into electrical signals for use by mobile terminal 110. Microphone 350 may be located anywhere on mobile terminal 110 and may be configured, for example, to convert spoken words or phrases into electrical signals for use by mobile terminal 110.

Figure 4:
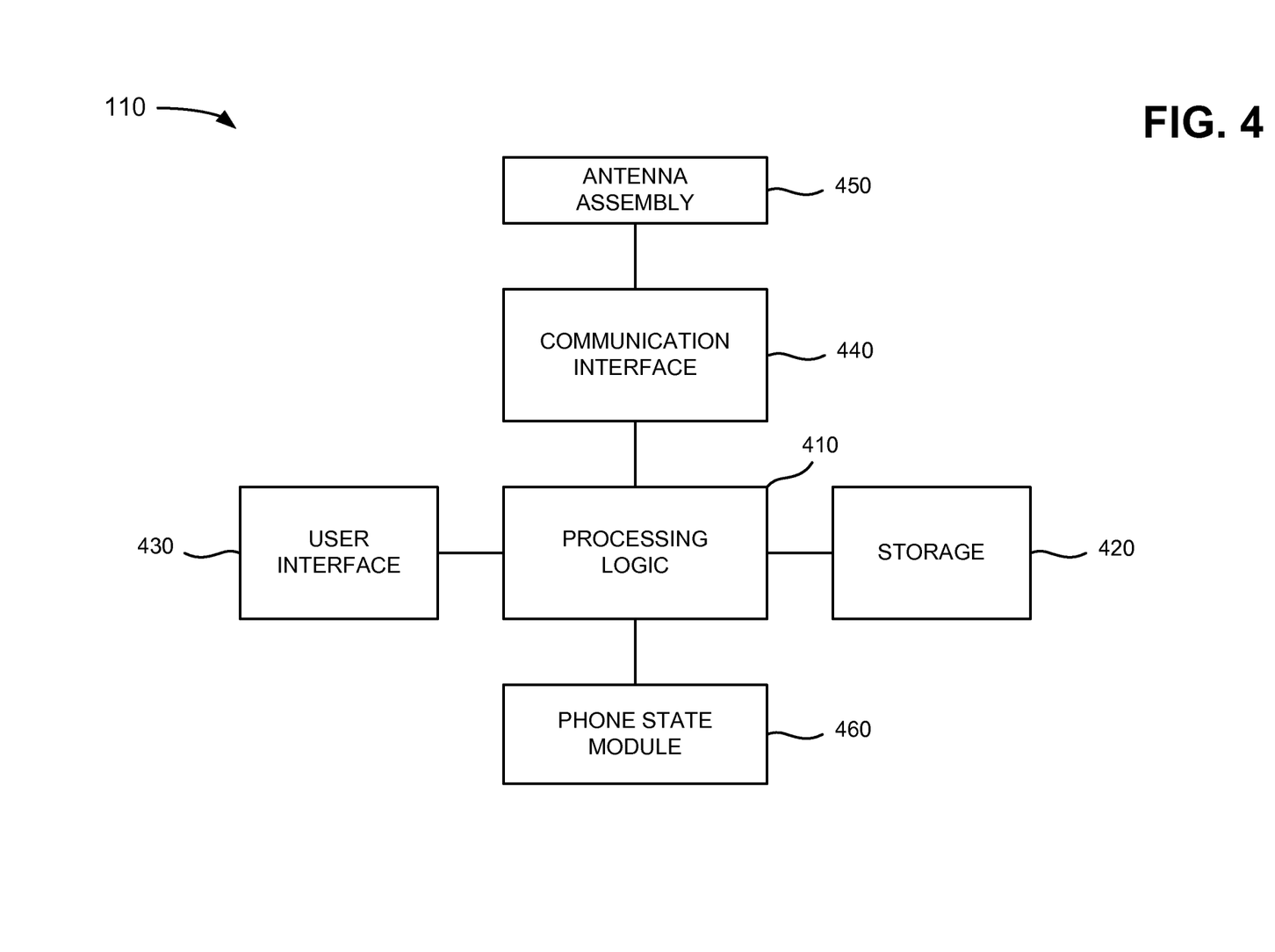
FIG. 4 is a diagram of an exemplary mobile terminal of FIG. 3.

FIG. 4 is a diagram of exemplary components of mobile terminal 110. As shown in FIG. 4, mobile terminal 110 may include processing logic 410, storage 420, user interface 430, communication interface 440, and antenna assembly 450, and phone state module 460. Processing logic 410 may include a processor, microprocessor, an application specific integrated circuit (ASIC), field programmable gate array (FPGA), or the like. Processing logic 410 may include data structures or software programs to control operation of mobile terminal 110 and its components. Storage 420 may include a random access memory (RAM), a read only memory (ROM), and/or another type of memory to store data and instructions that may be used by processing logic 410. Storage 420 may also store a contact list, a calendar of events and a number of template text messages as described below with reference to FIGS. 5-7.

User interface 430 may include mechanisms for inputting information to mobile terminal 110 and/or for outputting information from mobile terminal 110. Examples of input and output mechanisms might include a speaker to receive electrical signals and output audio signals, a microphone to receive audio signals and output electrical signals, control buttons and/or keys on a keypad to permit data and control commands to be input into mobile terminal 110, and a display to output visual information.

Communication interface 440 may include, for example, a transmitter that may convert baseband signals from processing logic 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna assembly 450 for transmission and reception of the RF signals. Communication interface 440 may also be configured to receive and process GPS signals from GPS satellites 150-170, for example. Antenna assembly 450 may include one or more antennas to transmit and receive RF signals and GPS signals over the air. Antenna assembly 450 may receive RF signals from communication interface 440 and transmit them over the air and receive RF signals over the air and provide them to communication interface 440.

Phone state module 460 may contain information relating to the state and/or position of mobile terminal 110. Phone state module 460 may calculate and determine the position of mobile terminal 110 from received GPS signals. Phone state module 460 and/or processing logic 410 may also access storage 420 to determine the state of mobile terminal 110, and may provide, for example, a display of template text message(s) based on the state of mobile terminal 110.

As will be described in detail below, mobile terminal 110 may perform operations in response to processing logic 410 executing software instructions to determine the state of mobile terminal 110, and provide a template text message(s) based on the determined state of mobile terminal 110, using an application contained in a computer-readable medium, such as storage 420. A computer-readable medium may be defined as a physical or logical memory device and/or carrier wave.

The software instructions may be read into storage 420 from another computer-readable medium or from another device via communication interface 440. The software instructions contained in storage 420 may cause processing logic 410 to perform processes that will be described later. Alternatively, hardwired circuitry may be used in place of or in combination with software instructions to implement processes consistent with the embodiments. Thus, implementations consistent with the principles of the embodiments are not limited to any specific combination of hardware circuitry and software.

Figure 5:
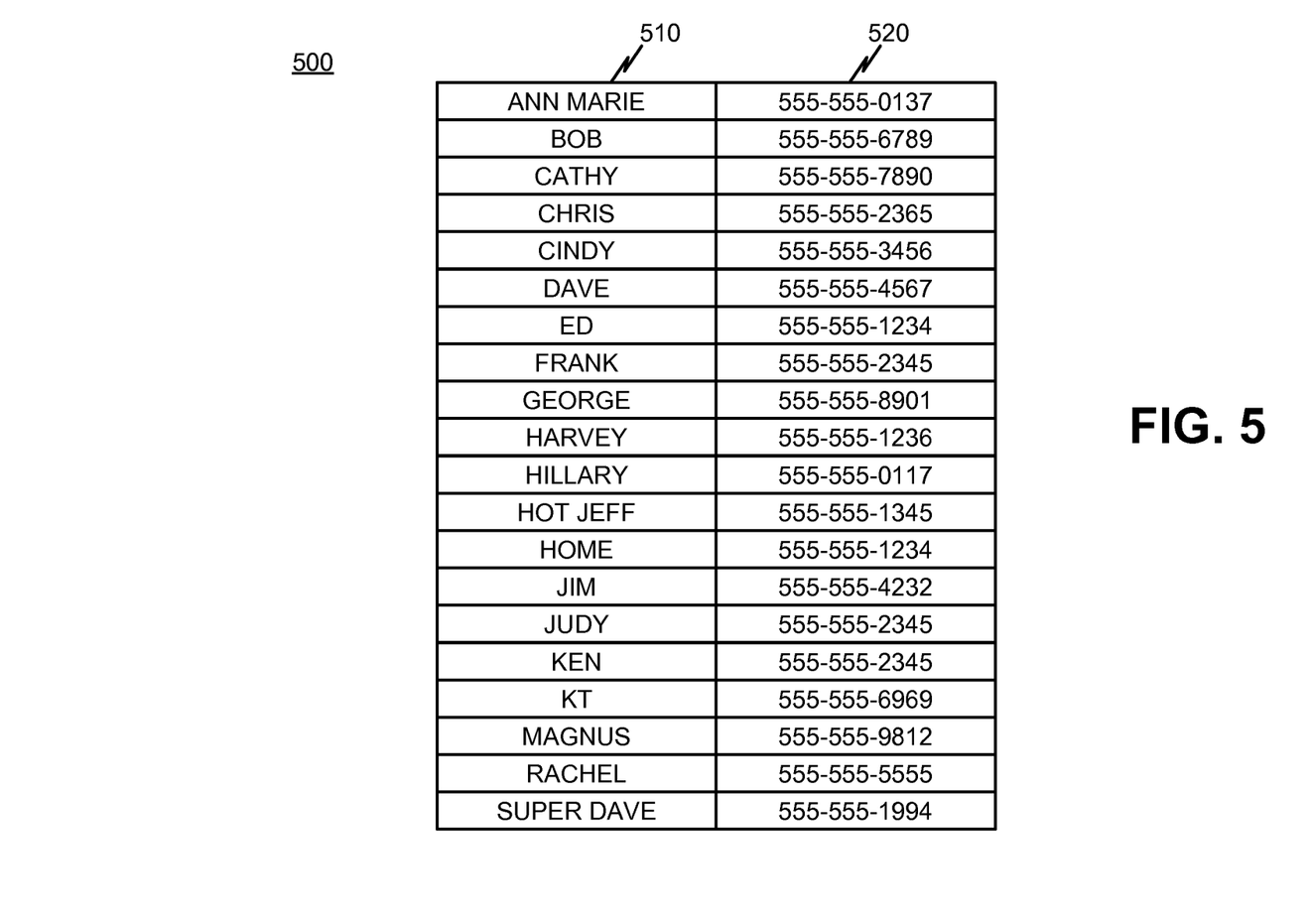
FIG. 5 is a diagram illustrating an exemplary contact list.

FIG. 5 illustrates an exemplary contact list 500. Contact list 500 may be stored on a computer-readable medium that can be used to store information in a machine-readable format. In one implementation, contact list 500 may store information that is used to form a displayable list on display 340. Exemplary contact list 500 may be stored, for example, in storage 420 of mobile terminal 110.

Contact list 500 may include a list of names, numbers or other information associated with contacts of a user of the mobile terminal. As shown, contact list 500 includes a number of entries each defined by a name field 510 and a number or caller identifier (CID) field 520. Information in contact list 500 may be arranged in any format.

Name field 510 may include information that identifies a user associated with a specific mobile terminal. The information in name field 510 may be entered by a user of mobile terminal 110 through a contact list menu for example, using keys 312 on keypad 310. Once a name is entered in name field 510, a user may save the name using control keys 320 and/or may be prompted to enter a phone number associated with the name. Also, for example, a number may be dialed or entered by a user of mobile terminal 110, and then the user may be automatically prompted to enter and save a name associated with the number in the contact list 500. In this example, a user may then enter a name that may be stored in name field 510 with the associated number in contact list 500.

Number field 520 may include information that identifies a phone number with an associated name in name field 510, for example. Number field 520 may include information, such as a phone number, an e-mail address, etc., that is uniquely associated with a mobile terminal, for example. The number stored in number field 520, for example, may also be referred to as a caller identifier (CID).

Figure 6:
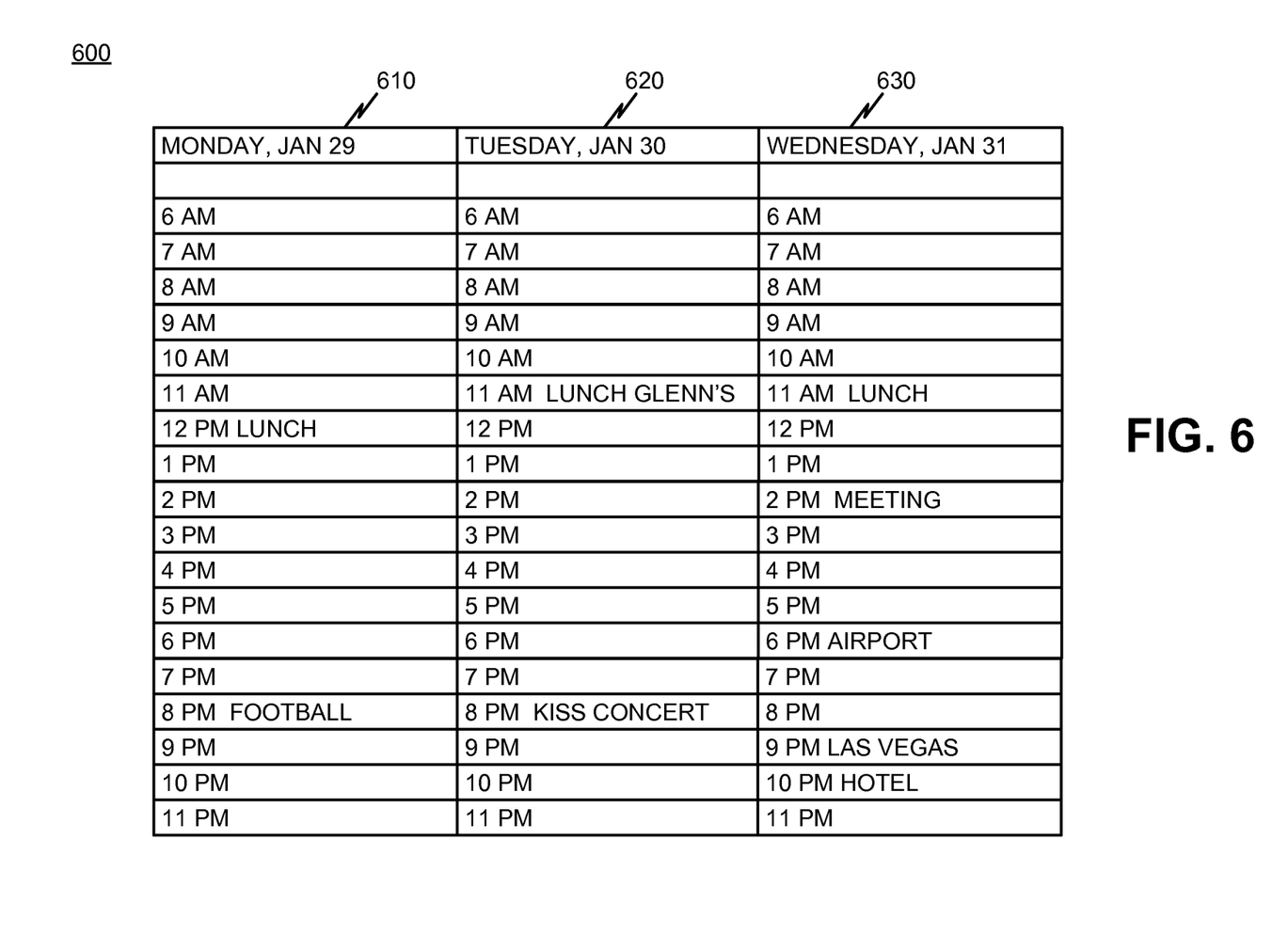
FIG. 6 is a diagram illustrating an exemplary calendar.

FIG. 6 illustrates an exemplary calendar 600. Calendar 600 may be stored on a computer-readable medium that can be used to store information in a machine-readable format. In one implementation, calendar 600 may store information that is used to form a displayable list on display 340. Exemplary calendar 600 may contain a number of days, 610-630 for example, that include the plans and/or events for each day. Exemplary calendar 600 may be stored in storage 420 of mobile terminal 110.

The information contained in calendar 600 may be entered by a user of mobile terminal 110 through a calendar menu, using keys on keypad 310. Once an event is entered in calendar 600, a user may save the entered data using control keys 320. In this example, a user of mobile terminal 110 may plan to eat lunch at noon and watch football at 8 PM on Monday, January 29. The events for Tuesday January 30, may be lunch at Glenn's from 11 AM till 12 PM and a KISS concert at 8 PM. The exemplary events for Wednesday January 31, may be lunch at 11 AM, a meeting from 2 PM to 3 PM, arrive at the airport at 6 PM, arrive in Las Vegas at 9 PM and check into the hotel at 10 PM.

Figure 7:
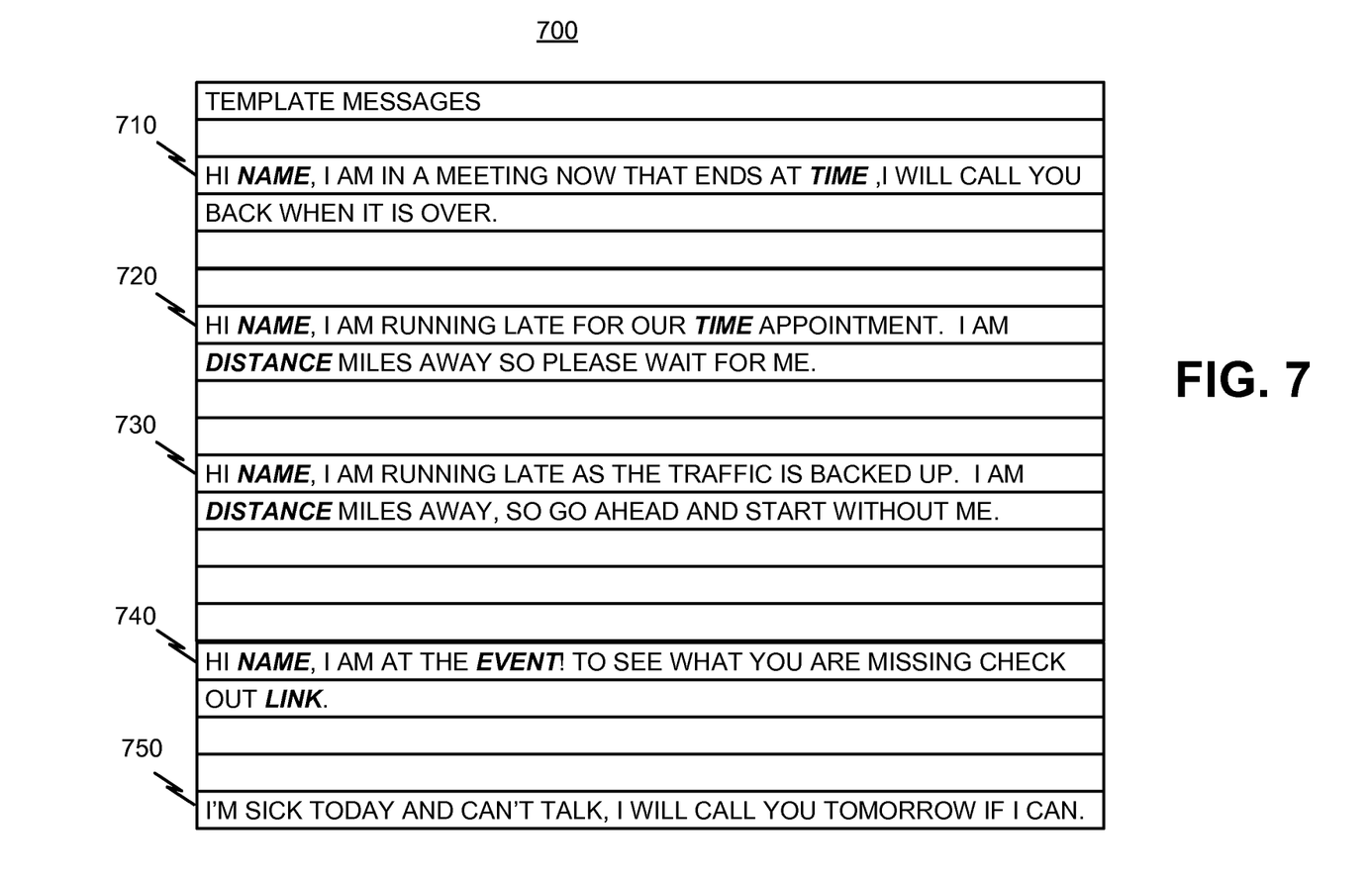
FIG. 7 illustrates exemplary template messages.

FIG. 7 illustrates exemplary template messages 700. Template messages 700 may be automatically provided based on the determined state of mobile terminal 110. Template messages 700 may be stored on a computer-readable medium that can be used to store information in a machine-readable format. In one implementation, template messages 700 may store information that is used to form a displayable list on display 340. Exemplary template messages 700 may be stored in storage 420 of mobile terminal 110.

Template messages 700 may be entered by a user of mobile terminal 110 using keys on keypad 310. Once a message is entered, a user may save the message using control keys 320. As shown in FIG. 7 for example, the capitalized and bolded words in the exemplary template messages 710-740 may be automatically provided by phone state module 460 based on the determined state of mobile terminal 110. For example, phone state module 460 may receive or access GPS position and time information, event information stored in calendar 600 and information stored in contact list 500 to provide information that is to be inserted into the template messages. In other embodiments, a number of template messages may be preprogrammed or downloaded into memory 420 of mobile terminal 110.

Template messages 710-750 may generally define messages that would be appropriate to automatically send to a caller. Template message 710, for example is "Hi NAME, I am in a meeting now that ends at TIME, I will call you back when it is over."

Figure 8:
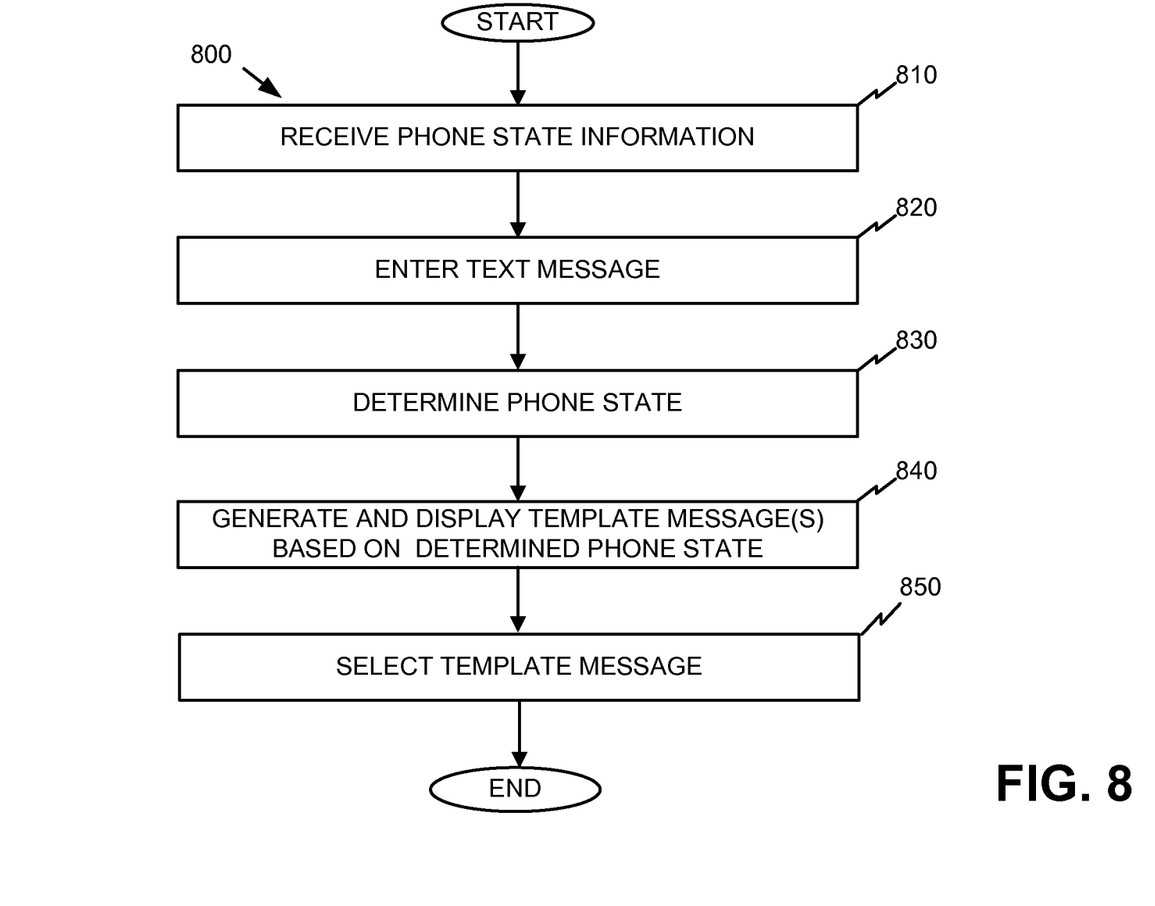
FIG. 8 is a flow diagram illustrating exemplary processing by a mobile terminal.

FIG. 8 illustrates exemplary processing 800 performed by mobile terminal 110. Processing may begin by receiving phone state information (act 810). For example, mobile terminal 110 may receive transmissions from GPS satellites 150-170 and may calculate its position (act 810). Mobile terminal 110 may also receive signals indicating a current day and time from GPS satellites 150-170 or may receive current day and time signals from network 140 (act 810), for example. Using keys on keypad 310, a user of mobile terminal 110 may enter events and information into calendar 600 (act 810). For example, on Tuesday Jan. 30, 2007, a user of mobile terminal 110 may enter information into calendar 600 that includes plans to eat lunch at Glenn's Restaurant from 11 AM to 12 PM, and plans to attend an event, such as a KISS concert at 8 PM that evening. Information relating to an address or position of the events in calendar 600 (e.g., address of Glenn's Restaurant) may also be entered and stored in calendar 600 (act 810). In still further examples, a user of mobile terminal 110 may enter information into calendar 600 indicating plans for a meeting from 2-3 PM on Wednesday January 31. Additionally, a user of mobile terminal 110 may enter information identifying the participants of the 2-3 PM meeting scheduled that day (act 810).

In further embodiments, receiving phone state information may include identifying parties communicating with mobile terminal 110 (act 810). For example, mobile terminal 110 may receive a phone call, a text message or an email from another mobile terminal or device. Using contact list 500, for example, a calling party's name (stored in name field 510) may be identified by accessing the number field 520 of contact list 500.

In still further embodiments, receiving phone state information may include receiving information from server 180 based on stored events in calendar 600 and/or position information of mobile terminal 110 (act 810). For example, mobile terminal 110 may receive links to websites and/or information and meta-data from server 180 relating to events in the calendar and/or the position of mobile terminal 110. For example, server 180 may perform an Internet search on terms stored in calendar 600 and may store (in phone state database 290) and/or transmit the search results of related information to mobile terminal 110. In other embodiments, mobile terminal 110 may contain software, such as in phone state module 460, to perform an Internet search using terms stored in calendar 600 to receive phone state information (act 810).

Processing may continue when a user of mobile terminal 110 begins to enter a text message (act 620). For example, a user of mobile terminal 110 may use control keys 320 to access and select a text messaging option from a menu of choices displayed via display 340.

In response to the user's desire to enter and send a text message (act 820), the phone state of mobile terminal 110 may be determined (act 830). For example, phone state module 460 may receive information relating to current day, time and location of mobile terminal 110, and may receive information relating to events stored in calendar 600 and identified callers determined from contact list 500. For example, if the current day and time information received indicates that it is 2:15 PM on Wednesday January 31, and meeting is scheduled from 2-3 PM that day (as stored in calendar 600), phone state module 460 may determine that a user of mobile terminal 110 is currently attending the scheduled meeting. In other embodiments, if the meeting location or position was also entered and stored into calendar 600, calculated GPS position information may also be used to determine that the user of mobile terminal 110 is currently at the meeting's location. Using received day and time and position information and stored calendar events, phone state module 460 may also determine that a user of mobile terminal 110 is not at a desired location, for example. For example, if the current position, time and day information is 10 miles west of the airport, at 6 PM on Wednesday January 31, and a flight is scheduled to leave the airport at 6 PM (as stored in calendar 600), phone state module 460 may determine that a user of mobile terminal 110 is not currently located at a scheduled event or appointment.

Based on the determined phone state (act 830) mobile terminal 110 may generate and display a template message(s) (act 840). For example, phone state module 460 may access stored template messages 700 and provide a number of possible template messages, via display 340. For example, a number of template messages may be displayed as shown in FIG. 9A.

Figure 9A:
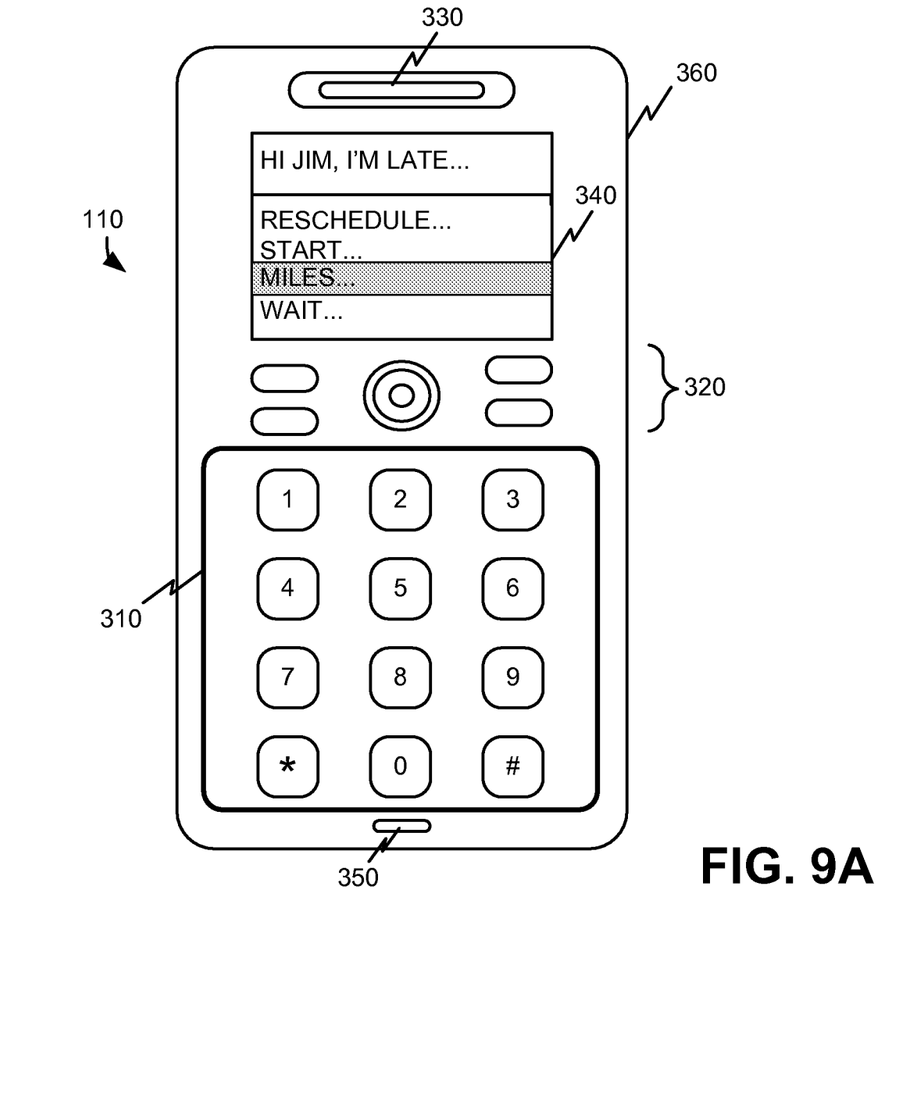
FIGS. 9A-9C are diagrams illustrating exemplary displays on a mobile terminal.

FIG. 9A shows an exemplary display of template messages generated by phone state module 460. In this example, phone state module 460 may determine that the position of mobile terminal 110 is not at the location of a meeting as stored in calendar 600. In this example, four template messages may be generated and displayed based on the determined state. The four messages may be, for example, "Hi Jim, I'm late can we reschedule the meeting in an hour?", "Hi Jim, I'm late go ahead and start without me.", "Hi Jim, I'm late, I am 5 miles away as traffic is backed up.", and "Hi Jim, I'm late for our 2 PM meeting, can you please wait 10 minutes!" In the example shown in FIG. 9A, as the number of messages and/or length of the text contained in template messages may be too large to simultaneously display via display 340, key words within the template messages may be displayed. In this example, a user may use control keys 320 to scroll through, highlight and select one of the displayed template messages. The text information relating to a name (Jim in this example), time, distance and the event (meeting in this example) may be automatically provided by the phone state module 460, for example.

In another example, if a position, day and time of mobile terminal 110 is determined to be at the stored position, day and time of an event in calendar 600, phone state module 460 may generate and display a template message as shown in FIG. 3. In this example, the name (Jim) in the displayed template message may be automatically included into the template message based on the name of the calling party determined from contact list 500. Also in this example, the word "Meeting" and the time of "3 PM" may also be automatically provided into the template text message based on the events stored in calendar 600.

Once the template messages have been displayed, a user may then select one of the displayed template message (act 850). For example, a user may use control keys 320 to scroll through the choices of displayed template messages as shown in FIG. 9A. After selecting a template message, a user may, for example edit, add and/or delete the text in the message using keys 310. After selecting and/or editing a template message, the message may be sent as a text message using control keys 320, for example.

Figure 9B:
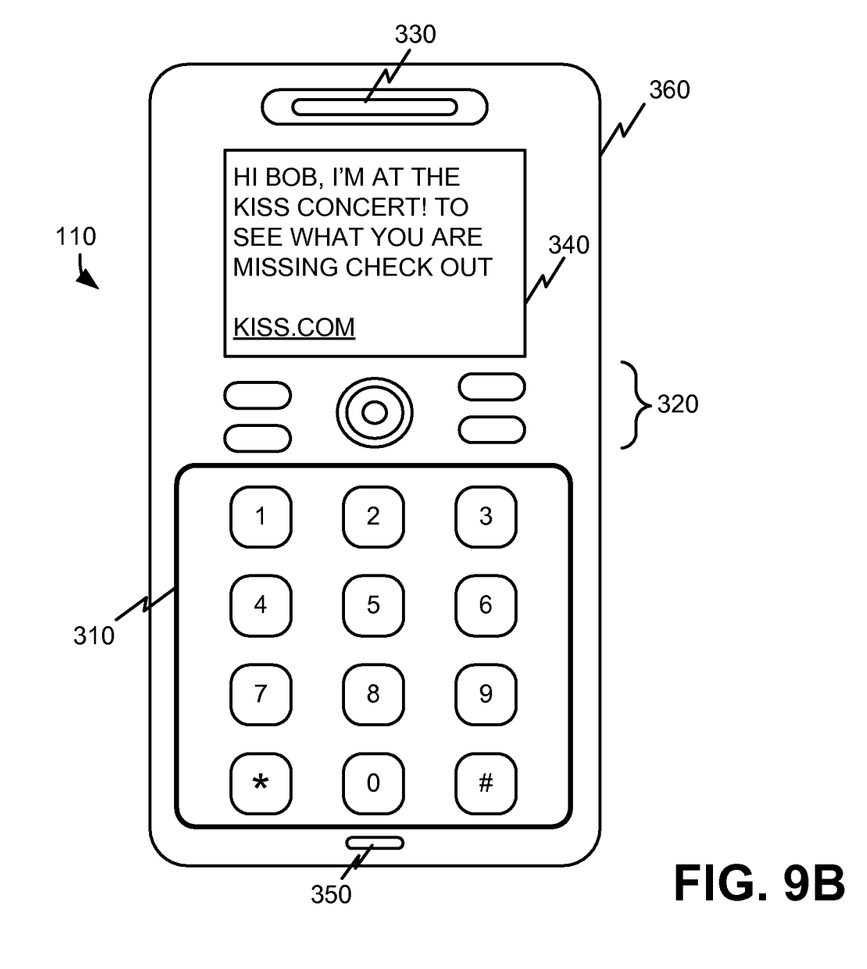

Another example of generating and displaying a template message (act 840) is shown in FIG. 9B. In this example, display 340 shows an exemplary template message "Hi Bob, I'm at the KISS concert! To see what you are missing check out KISS.com." In this example, phone state module 460 may generate and display the template message based on the event stored in the calendar 600 and the determined position of mobile terminal 110. A link "KISS.com" may also be automatically provided into template message by phone state module 460. The link KISS.com may be provided to phone state module 460 from server 180 performing a search on network 140 for example.

Figure 9C:
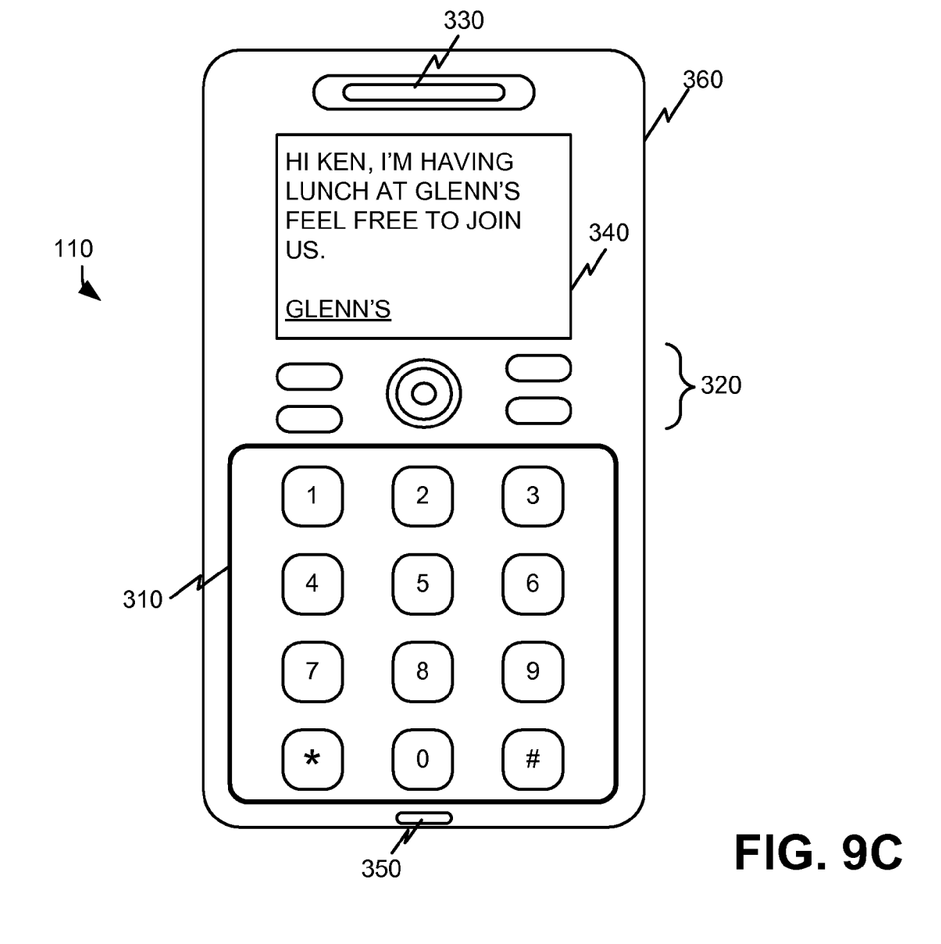

Another example of generating and displaying a template message (act 840) is shown in FIG. 9C. In this example, a template message "Hi Ken, I am having lunch at Glenn's, feel free to join us. Glenn's" may be displayed to the user of mobile terminal 110. In this example, phone state module 460 may generate and display the template message based on the event stored in calendar 600 and information provided from server 180. For example, server 180 may search a network, such as network 140 or the Internet, for information or links related to "Glenn's" and provide the information to mobile terminal 110. The exemplary template message may then be transmitted to another mobile terminal, where the user of another mobile terminal may click on the link to view information related to "Glenn's."

CONCLUSION

Implementations consistent with the systems and methods described herein generate and display template messages based on the determined state of a mobile terminal. A selected template message may form the basis of a text message. The state of the mobile terminal may be determined by receiving information related to day, time and location of a mobile terminal, the identification of a caller and the event information stored in a calendar.

The foregoing description of the embodiments provides illustration and description, but is not intended to be exhaustive or to limit implementations to the precise form disclosed. Modifications and variations are possible in light of the above teachings or may be acquired from practice of the implementations.

For example, the embodiments have been described in the context of a mobile terminals communicating over a network and employing GPS features. The embodiments may be implemented in other devices or systems and/or networks. For example, mobile terminal positioning may be performed using cellular positioning or the Galileo global travel distribution system as an alternative to GPS.

Further, while series of acts have been described with respect to FIG. 8, the order of the acts may be varied in other implementations. Moreover, non-dependent acts may be performed in parallel.

It will also be apparent to one of ordinary skill in the art that aspects of the implementations, as described above, may be implemented in cellular communication devices/systems, methods, and/or computer program products. Accordingly, the implementations may be embodied in hardware and/or in software (including firmware, resident software, micro-code, etc.). Furthermore, the implementations may take the form of a computer program product on a computer-usable or computer-readable storage medium having computer-usable or computer-readable program code embodied in the medium for use by or in connection with an instruction execution system. The actual software code or specialized control hardware used to implement aspects of the embodiments is not limiting of the systems and methods described. Thus, the operation and behavior of the aspects were described without reference to the specific software code—it being understood that one of ordinary skill in the art would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the systems and methods described unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the systems and methods described herein are defined by the claims and their equivalents.

What is claimed is:

1. A method comprising:
   storing a plurality of messages in a mobile terminal, each message, of the plurality of messages, including one or more areas in which text may be dynamically inserted before the message is transmitted to another mobile terminal;
   determining a state of the mobile terminal;
   identifying at least one message, of the plurality of messages, based on the determined state of the mobile terminal;
   automatically inserting text into the one or more areas of the identified at least one message to create at least one modified message;
   displaying the at least one modified message;
   detecting selection of one message of the provided at least one modified message; and
   transmitting a text message to a second mobile terminal, the text message including the selected one message;
   storing a calendar of events; and
   determining a position of the mobile terminal;
   inserting information into the identified at least one message based on at least one of the events in the calendar or the position of the mobile terminal;
   inserting links in the identified at least one message based on the at least one of the events in the calendar.

2. The method of claim 1, where the state of the mobile terminal is determined based on at least one of the events in the calendar or the position of the mobile terminal.

3. A mobile terminal, comprising:
   a memory to store a calendar of events and a plurality of text messages, each text message, of the plurality of text messages, including one or more areas in which text may be dynamically inserted before the text message is transmitted;
   a display; and
   logic to:
      determine a state of the mobile terminal based on the calendar,
      select at least one of the stored plurality of text messages based on the determined state of the mobile terminal,
      automatically insert text into the one or more areas of the at least one selected text message,
      control the display to display the at least one selected text message with the inserted text,
      detect selection of one text message of the displayed at least one text message with the inserted text, and
      cause the selected one text message to be transmitted to a second mobile terminal.

4. The mobile terminal of claim 3, where the logic is further to:
   determine a position of the mobile terminal.

5. The mobile terminal of claim 4, where, when automatically inserting text, the logic is further to:
   insert information into the at least one selected text message based on at least one of the position of the mobile terminal or events in the calendar.

6. The mobile terminal of claim 3, where, when selecting at least one of the stored plurality of text messages, the logic is further to:
   select more than one of the stored plurality of text messages based on the determined state of the mobile terminal.

7. The mobile terminal of claim 6, where the logic is further to:
   display at least a portion of each of the selected more than one of the stored plurality of text messages.

8. A mobile terminal comprising:
   means for determining a state of the mobile terminal in response to a user initiating creation of a text message;
   means for automatically inserting text into at least one of a plurality of stored template messages based on the determined state of the mobile terminal before the at least one of the plurality of stored template messages are transmitted to another mobile terminal; and
   means for displaying the at least one of the plurality of stored template messages, where the means for determining the state of the mobile terminal further comprises:
   means for storing events; and means for determining a position of the mobile terminal;
   means for inserting links into the at least one of the plurality of stored template messages based on the determined position of the mobile terminal.

9. The mobile terminal of claim 8, further comprising:
   means for storing the plurality of template messages.

10. The mobile terminal of claim 9, further comprising:
    means for selecting the at least one of the plurality of stored template messages based on the determined state of the mobile terminal.

11. The mobile terminal of claim 10, further comprising:
    means for selecting one of the displayed at least one of the plurality of stored template messages.

12. The mobile terminal of claim 8, further comprising:
    means for editing the displayed at least one of the plurality of stored template messages.

13. The mobile terminal of claim 12, further comprising:
    means for sending the displayed at least one of the plurality of stored template messages to the other mobile terminal.

14. The mobile terminal of claim 8, where the text inserted into the at least one of the plurality of stored template messages includes information relating to at least one of the stored events or the determined position of the mobile terminal.

15. The mobile terminal of claim 9, further comprising:
    means for allowing a user to enter the plurality of template messages.

* * * * *